United States Patent
Khafizov et al.

(10) Patent No.: US 7,180,871 B1
(45) Date of Patent: Feb. 20, 2007

(54) ROUND TRIP TIMEOUT ADJUSTMENT IN A CELLULAR WIRELESS COMMUNICATION SYSTEM

(75) Inventors: Farid T. Khafizov, Plano, TX (US); Mehmet Yavuz, Plano, TX (US); Nanping Ding, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 1020 days.

(21) Appl. No.: 10/173,093

(22) Filed: Jun. 15, 2002

Related U.S. Application Data

(60) Provisional application No. 60/306,323, filed on Jul. 18, 2001.

(51) Int. Cl.
*H04B 7/00* (2006.01)
*H04L 12/66* (2006.01)

(52) U.S. Cl. .................. 370/252; 370/349; 370/352

(58) Field of Classification Search .............. None
See application file for complete search history.

(56) References Cited

U.S. PATENT DOCUMENTS

| | | | |
|---|---|---|---|
| 6,473,399 B1 * | 10/2002 | Johansson et al. ......... 370/229 |
| 6,757,245 B1 * | 6/2004 | Kuusinen et al. .......... 370/230 |
| 6,760,860 B1 * | 7/2004 | Fong et al. .................. 714/4 |
| 6,771,659 B1 * | 8/2004 | Parantainen et al. ....... 370/466 |
| 6,992,982 B1 * | 1/2006 | Meyer et al. .............. 370/231 |

* cited by examiner

*Primary Examiner*—Doris H. To
*Assistant Examiner*—Soon D. Hyun
(74) *Attorney, Agent, or Firm*—Garlick Harrison & Markison; Bruce E. Garlick

(57) ABSTRACT

A method for servicing a data communication in a cellular wireless communication system adjusts the ARQ operations of an upper protocol layer to compensate for fluctuating bandwidth provided by the cellular wireless communication system. In one embodiment, a Retransmission Time Out (RTO) of the ARQ operations of the upper protocol layer, e.g., Transmission Control Protocol layer, is adjusted to compensate for the fluctuating bandwidth provided by the cellular wireless communication system. Radio resources include a fundamental channel (FCH) and a supplemental channel (SCH). The FCH is allocated for the duration of the data communication while the SCH is periodically allocated and released. The RTO is adjusted so that unnecessary retransmissions are precluded when the SCH is released and also so that retransmissions of lost data segments occur.

20 Claims, 8 Drawing Sheets

ROUND TRIP TIMEOUT ADJUSTMENT IN A CELLULAR WIRELESS COMMUNICATION SYSTEM

CROSS REFERENCE TO RELATED APPLICATION

This application claims priority to U.S. Provisional Application Ser. No. 60/306,323, filed Jul. 18, 2001, the disclosure of which is incorporated herein by reference in its entirety.

BACKGROUND

1. Technical Field

The present invention relates generally to cellular wireless communication systems; and more particularly to the transmission of data communications in cellular wireless communication systems.

2. Related Art

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Significant performance issues exist when using a cellular wireless communication system to service data communications. Cellular wireless communication systems were initially designed to service the well-defined requirements of voice communications. Generally speaking, voice communications require a sustained bandwidth with minimum signal-to-noise ratio (SNR) and continuity requirements. Data communications, on the other hand, have very different performance requirements. Data communications are typically bursty, discontinuous, and may require a relatively high bandwidth during their active portions.

To understand the difficulties in servicing data communications within a cellular wireless communication system, it is best to first consider the structure and operation of a cellular wireless communication system. Cellular wireless communication systems include a "network infrastructure" that wirelessly communicates with wireless subscriber units within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, a wireless subscriber unit communicates with one (or more) of the base stations. Transmissions from a BSC to a wireless subscriber unit are referred to as "forward link" transmissions and transmissions from a wireless subscriber unit to its servicing base station are referred to as "reverse link" transmissions. A BSC coupled to the servicing base station routes voice communications between the MSC and the serving base station. The MSC routes the voice communication to another MSC or to the public switched telephone network (PSTN). BSCs route data communications between a servicing base station and a packet data network that couples to the Internet and other networks. The wireless link between the base station and the wireless subscriber unit is defined by one of a plurality of operating standards, e.g., AMPS, TDMA, CDMA, GSM, etc. These operating standards, as well as new 3G and 4G operating standards, define the manner in which the wireless link may be allocated, setup, serviced and torn down. Generally, a wireless link between a base station and a serviced wireless subscriber unit is serviced by a respective wireless channel that is time varying. Data that is transmitted between the base station and the serviced wireless subscriber unit is arranged in physical layer frames that typically carry a preamble, a header, data, and a trailer.

Each base station supports a number of wireless subscriber units but is limited in its total transmit power. This total transmit power must be allocated among the number of serviced users. Because of limitations on allocated transmit power and because of the time varying nature of respective wireless channels corresponding to the number of serviced users, the data carried by any particular physical layer frame may be received erroneously. Such an event is referred to as a "frame error". The rate at which frame errors occur is known as the Frame Error Rate (FER). While some wireless cellular systems include mechanisms at the physical layer to detect frame errors, other wireless cellular systems do not include error detection at the physical layer and rely upon higher protocol layer operations to detect such errors. As is known, as allocated transmit power is increased, FER decreases, and vice versa. However, an increase in the transmit power for any given link increase interference and typically reduces the transmit power that may be allocated to other links.

Operation of the higher protocol layers requires error free delivery of data. In an attempt to provide error free delivery of data, higher layer protocols such as the Radio Link Protocol (RLP) layer and the Transmission Control Protocol (TCP) layer include Automatic Repeat reQuest (ARQ) operations.

With negative ARQ operations, a Negative AcKnowledgement (NAK) is sent from a receiving device to a transmitting device when the receiving device erroneously receives a data segment or when the receiving device determines that a transmitted data segment has been lost, e.g., when data segments surrounding a lost data segment have been received. The NAK identifies the data segment and, upon receipt of the NAK, the transmitting device retransmits the data segment.

With positive ARQ operations, an ACKnowledgement (ACK) is sent from a receiving device to a transmitting device when the receiving device correctly receives data. The transmitting device determines that retransmission is required when an ACK is not received for a respective data segment within a particular period of time, i.e., before a Retransmission Time Out (RTO) period expires. The transmitting device sets a RTO timer for each data segment upon its transmission. If the RTO timer for the data segment expires prior to receipt of a corresponding ACK, the transmitting device automatically retransmits the data segment.

The TCP layer uses positive ARQ operation and RTO detection. In determining an appropriate RTO value, the TCP layer periodically measures the Round-Trip Time (RTT) experienced during a data communication. RTT varies over time and TCP tracks these changes in the RTT. In the original TCP specification, the RTT was smoothed using a low-pass filter $R=0.9*R+0.1*N$, where R is the old RTT value and N is the newly measured RTT. Then the recommended retransmission timeout value was set to $RTO=2*R$. Later, the RTO was modified to consider not only the RTT values but also their variance. The RTO calculations were modified such that: $RTO=R+2*D$, where $R=(7/8)*R+(1/8)*N$, and $D=(3/4)*D+(1/4)*abs(R-N)$, which included both the RTT value (R) and its mean deviation (D). Later, the impact of variance in the RTT was increased by changing the mean deviation multiplication factor from 2 to 4, such that $RTO=R+4*D$. Typically, TCP RTO determination algorithms model the delay along the network path as a normally distributed random variable with slowly varying mean and standard deviation.

In order to maximize system throughput, retransmission of data segments should only occur when the data segments are erroneously received or when they are permanently lost prior to receipt. In an attempt to meet these goals, the determined RTO must be small enough to detect lost data segments but large enough to avoid unnecessary retransmissions of data segments that are not lost but only delayed. Unfortunately, these are conflicting goals. The existing TCP RTO selection algorithms works well when either the delay variance is low or the data segment loss is low. However, when delay variance and data loss rates are both high, the existing TCP RTO selection algorithms work poorly, especially when the mean delay is also high.

In a cellular wireless communication system, the RTT value, its mean deviation, and packet loss are all often high. Therefore, existing RTO calculation algorithms are generally inadequate for TCP layers serviced by cellular wireless communication systems, especially in the case of "finite burst" data communications. With "finite burst" data communications, Supplemental Channels (SCHs) are constantly allocated and released. For example, in one mode of 1×RTT operations in which one or more SCH(s) is shared among a plurality of users, each SCH is allocated to one of the users, released from the user after 5.12 seconds, and then reallocated to the user (or another user) after a delay period, e.g., 1 second. This pattern of allocation, release, and reallocation continues until the completion of the data communications. These operations result in fluctuating bandwidth, from the perspective of the TCP layer, where bandwidth oscillates as the SCH is allocated and released during the data communication. Because such bandwidth oscillation is not generally present in wired networks, empirically designed TCP algorithms that were developed for wired networks do not function well in these types of cellular wireless communication systems.

Thus, there exists a need in the art for improved ARQ operations that may be used within cellular wireless communication systems that support fluctuating bandwidth operations.

SUMMARY OF THE INVENTION

In order to overcome the shortcomings of the prior operations, among other shortcomings, a method for servicing a data communication in a cellular wireless communication system adjusts the ARQ operations of an upper protocol layer to compensate for fluctuating bandwidth provided by the cellular wireless communication system. In one particular embodiment of the present invention, a Retransmission Time Out (RTO) of the ARQ operations of the upper protocol layer is adjusted to compensate for the fluctuating bandwidth provided by the cellular wireless communication system. The method of the present invention includes first receiving a request from a wireless subscriber unit to service the data communication. In response to this request, the cellular wireless communication system allocates radio resources to the wireless subscriber unit. These radio resources include a fundamental channel (FCH) and a supplemental channel (SCH). While the FCH is allocated for the duration of the data communication, the SCH is periodically allocated and released for at least a portion of the duration of the data communication and has associated therewith a burst delay. When both the FCH and SCH service the data communication, the bandwidth provided by the cellular wireless communication system is greater than when only the FCH services the data communication.

The method then includes determining a Retransmission Time Out (RTO) adjustment factor for the upper protocol layer servicing the wireless subscriber unit, e.g., Transmission Control Protocol (TCP) layer. The RTO adjustment factor is based upon the allocation and release characteristics of the SCH. In particular, the RTO adjustment factor may be based upon the burst delay between allocation periods of the SCH. The RTO value of the upper protocol layer is then adjusted based upon the RTO adjustment factor to produce an adjusted RTO value. The adjusted RTO value is then used in servicing the data communication for the wireless subscriber unit to increase throughput at the upper protocol layer.

According to the present invention, the adjusted RTO value may also be based upon a Round Trip Time (RTT) of the data communication when serviced only by the FCH. With the adjusted RTO considering such operational characteristics, when the SCH is deallocated, the ARQ operations of the upper protocol layer will not time out until it is likely that data segments have been lost. In this case, the adjusted RTO value may be based upon a multiple of the RTT of the data communication when serviced only by the FCH, this multiple of the RTT reflects a number of data segments that are received by the upper protocol layer before producing an ACK. In still another operation, the adjusted RTO value is also based upon a total number of unacknowledged upper protocol layer data segments when the SCH becomes unavailable. This operation compensates for the additional delay that is introduced when the SCH is released.

Modifications of the upper protocol layer must be made in each of a pair of servicing devices that reside on opposite sides of the wireless link of the cellular wireless communication system servicing the data communication. In one particular embodiment, one copy of the upper protocol layer is operational in the wireless subscriber unit and one copy of the upper protocol layer is operational in an intermediate cellular wireless communication system device servicing the wireless subscriber unit. In this embodiment, the intermediate cellular wireless communication system device servicing the wireless subscriber unit is selected from the group consisting of a base station, a base station controller, a Packet Data Servicing Node, and a Packet Control Function. In another embodiment, one copy of the upper protocol layer is operational in the wireless subscriber unit and one copy of the upper protocol layer is operational in a remote communication device with which the wireless subscriber unit is communicating.

By adjusting the RTO according to the present invention, ARQ operational problems caused by the allocation and release of the SCH are overcome. With the operation of the present invention, not only are unnecessary retransmissions substantially avoided, lost packets are substantially detected. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
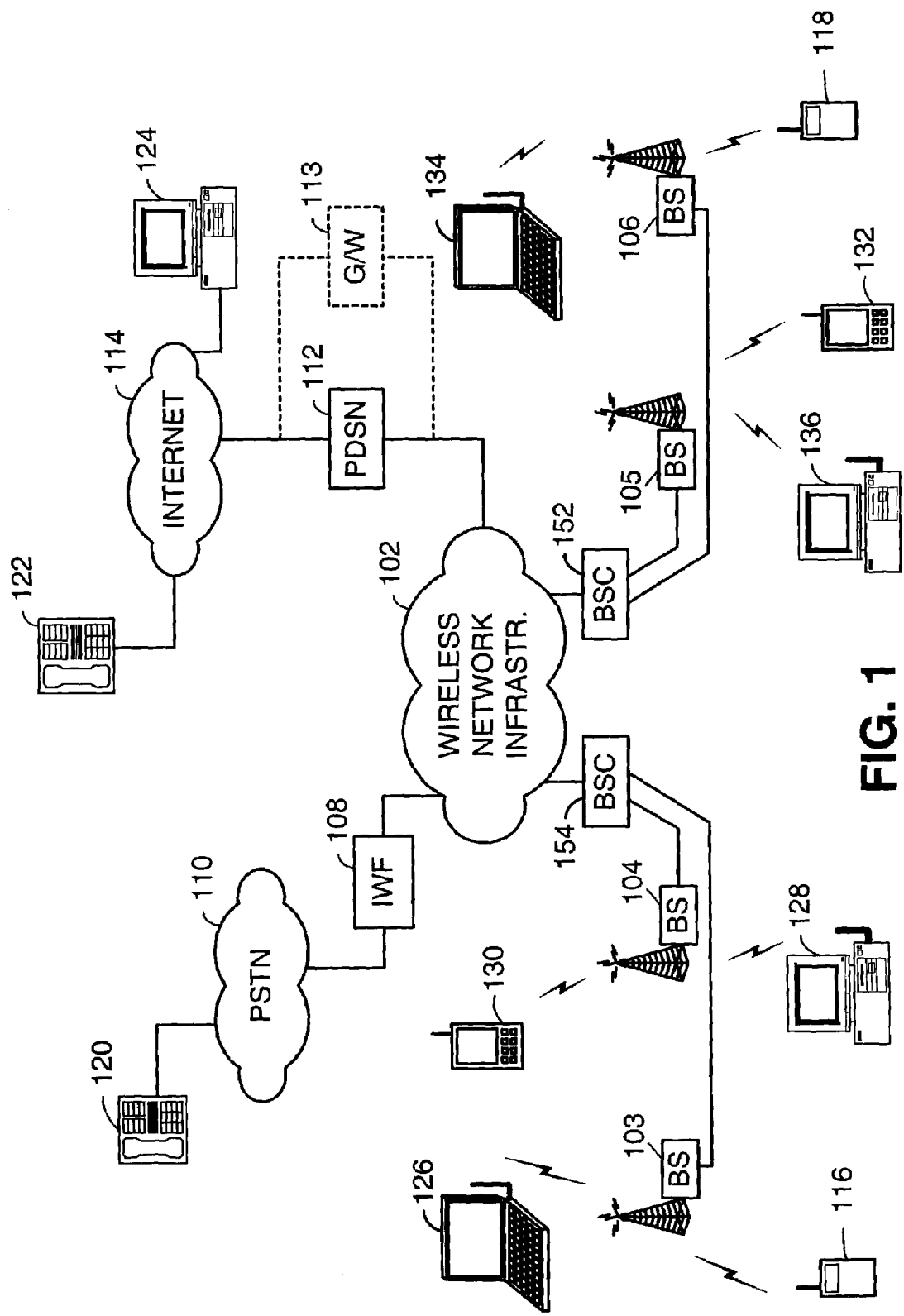
FIG. 1 is a system diagram illustrating a portion of a cellular wireless communication system constructed according to the present invention.

FIG. 1 is a system diagram illustrating a portion of a cellular wireless communication system constructed according to the present invention. The cellular wireless communication system includes a wireless network infrastructure 102, base station controllers (BSCs) 152 and 154, and base stations 103, 104, 105, and 106. The wireless network infrastructure 102 couples to the Internet 114. The wireless network infrastructure 102 also couples to the Public Switched Telephone Network (PSTN) 110. In one embodiment of the present invention, the wireless network infrastructure 102 is circuit switched, couples directly to the PSTN 110, and couples to the Internet 114 via a gateway (G/W) 113. In another embodiment of the present invention, the wireless network infrastructure 102 is packet switched, couples to the Internet 114 via a Packet Data Servicing Node (PDSN) 112, and couples to the PSTN 110 via an interworking function (IWF) 108.

A conventional voice terminal 120 couples to the PSTN 110. A Voice over Internet Protocol (VoIP) terminal 122 and a personal computer 124 couple to the Internet 114. Wireless subscriber units 116, 118, 126, 128, 130, 132, 134, and 136 couple to the cellular wireless communication system via wireless links with the base stations 103–106. As illustrated, wireless subscriber units may include cellular telephones 116 and 118, laptop computers 126 and 134, desktop computers 128 and 136, and data terminals 130 and 132. However, the wireless system supports communications with other types of wireless subscriber units as well.

Each of the base stations 103–106 services a cell/set of sectors within which it supports wireless communications. Wireless links that include both forward link components and reverse link components support wireless communications between the base stations and their serviced wireless subscriber units. These wireless links support data communications, VoIP and other multimedia communications. The teachings of the present invention may be applied equally to any type of packetized communication.

The cellular wireless communication system operates according to a wireless standard that has been modified according to the present invention. Examples of such wireless standards include CDMA standards such a 1×RTT, 1×EV-DO, 1×EV-DV, UMTS, etc. However, the present invention is also applicable to other standards as well, e.g., TDMA standards, GSM standards, etc. The cellular wireless communication system supports both voice and data traffic. However, operations according to the present invention relate to the service of high-rate data communications. As is generally known, devices such as laptop computers 126 and 134, desktop computers 128 and 136, data terminals 130 and 132, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe.

A user of a particular wireless subscriber unit may subscribe to a service that provides a relatively high bandwidth of capacity. In order to service these high-speed data communication requirements, in particular the larger download data-rate requirements, the IS-95B and 1×RTT standards contemplate multiple download channels, i.e., fundamental channels (FCHs) and supplemental channels (SCHs). The SCH is a traffic channel that is allocated to a particular wireless subscriber unit to augment the FCH, which is also a traffic channel. In some standards, the SCH provides variable rate data service, e.g., 19.2 kbps, 38.4 kbps, 76.8 kbps, 153.6 kbps, and 307.2 kbps, among other data rates.

The data rate that can be provided via a particular SCH is based upon the signal quality as seen by a serviced wireless subscriber unit. The signal quality will depend upon the distance of the wireless subscriber unit from its servicing base station, the maximum transmit power that the servicing base station can provide for the channel, the propagation path characteristics from the base station to the wireless subscriber unit, and the noise present at the wireless subscriber unit, among other factors. Thus, if the signal quality that may be provided is high, the SCH will support a relatively higher data rates by using a relatively higher symbol rate. If the signal quality that may be provided is low, the SCH will support a relatively lower data rate by using a lower symbol rate. In any case, as will be further described with reference to FIG. 3, during the duration of a data communication, the FCH will remain allocated while the SCH will be periodically allocated and released.

According to the present invention, the ARQ operations of an upper protocol layer are adjusted to compensate for fluctuating bandwidth provided by the cellular wireless communication system. In one particular embodiment of the present invention, a Retransmission Time Out (RTO) of the ARQ operations of the upper protocol layer is adjusted to compensate for the fluctuating bandwidth provided by the cellular wireless communication system. The method of the present invention includes first receiving a request from a wireless subscriber unit, e.g., laptop computer 134, to service the data communication. In response to this request, the cellular wireless communication system allocates radio resources to the wireless subscriber unit 134 at base station 106. These radio resources include a FCH and a SCH. While the FCH is allocated for the duration of the data communication, the SCH is periodically allocated and released for at least a portion of the duration of the data communication and has associated therewith a burst delay. When both the FCH and SCH both service the data communication, the bandwidth provided by the cellular wireless communication system is greater than when only the FCH services the data communication.

Operation according to the present invention includes determining a Retransmission Time Out (RTO) adjustment factor for the upper protocol layer servicing the wireless subscriber unit, e.g., Transmission Control Protocol (TCP) layer. The RTO adjustment factor is based upon the allocation and release characteristics of the SCH. In particular, the RTO adjustment factor may be based upon the burst delay between allocation periods of the SCH. The RTO value of the upper protocol layer is then adjusted based upon the RTO adjustment factor to produce an adjusted RTO value. The adjusted RTO value is then used in servicing the data communication for the wireless subscriber unit to increase throughput at the upper protocol layer.

According to the present invention, the adjusted RTO value may also be based upon a Round Trip Time (RTT) of the data communication when serviced only by the FCH. With the adjusted RTO considering such operational characteristics, when the SCH is deallocated, the ARQ operations of the upper protocol layer will not time out until it is likely that data segments have been lost. In this case, the adjusted RTO value may be based upon a multiple of the RTT of the data communication when serviced only by the fundamental channel, this multiple reflecting a number of data segments that are received by the upper protocol layer before producing an ACK. In still another operation, the adjusted RTO value is also based upon a total number of unacknowledged upper protocol layer data segments when the SCH becomes unavailable. This operation compensates for the additional delay that is introduced when the SCH is released.

Modifications of the upper protocol layer must be made in each of a pair of servicing devices that reside on opposite sides of the wireless link of the cellular wireless communication system servicing the data communication. In one particular embodiment, one copy of the upper protocol layer is operational in the wireless subscriber unit 134 and one copy of the upper protocol layer is operational in an intermediate cellular wireless communication system device servicing the wireless subscriber unit. In this embodiment, the intermediate cellular wireless communication system device servicing the wireless subscriber unit is selected from the group consisting of a base station 106, the BSC 152, the PDSN 112, and a Packet Control Function that may be present in the BSC 152 or another wireless communication system device. In another embodiment, one copy of the upper protocol layer is operational in the wireless subscriber unit 134 and one copy of the upper protocol layer is operational in a remote communication device, e.g., Web Server 124, with which the wireless subscriber unit 134 is communicating.

Figure 2:
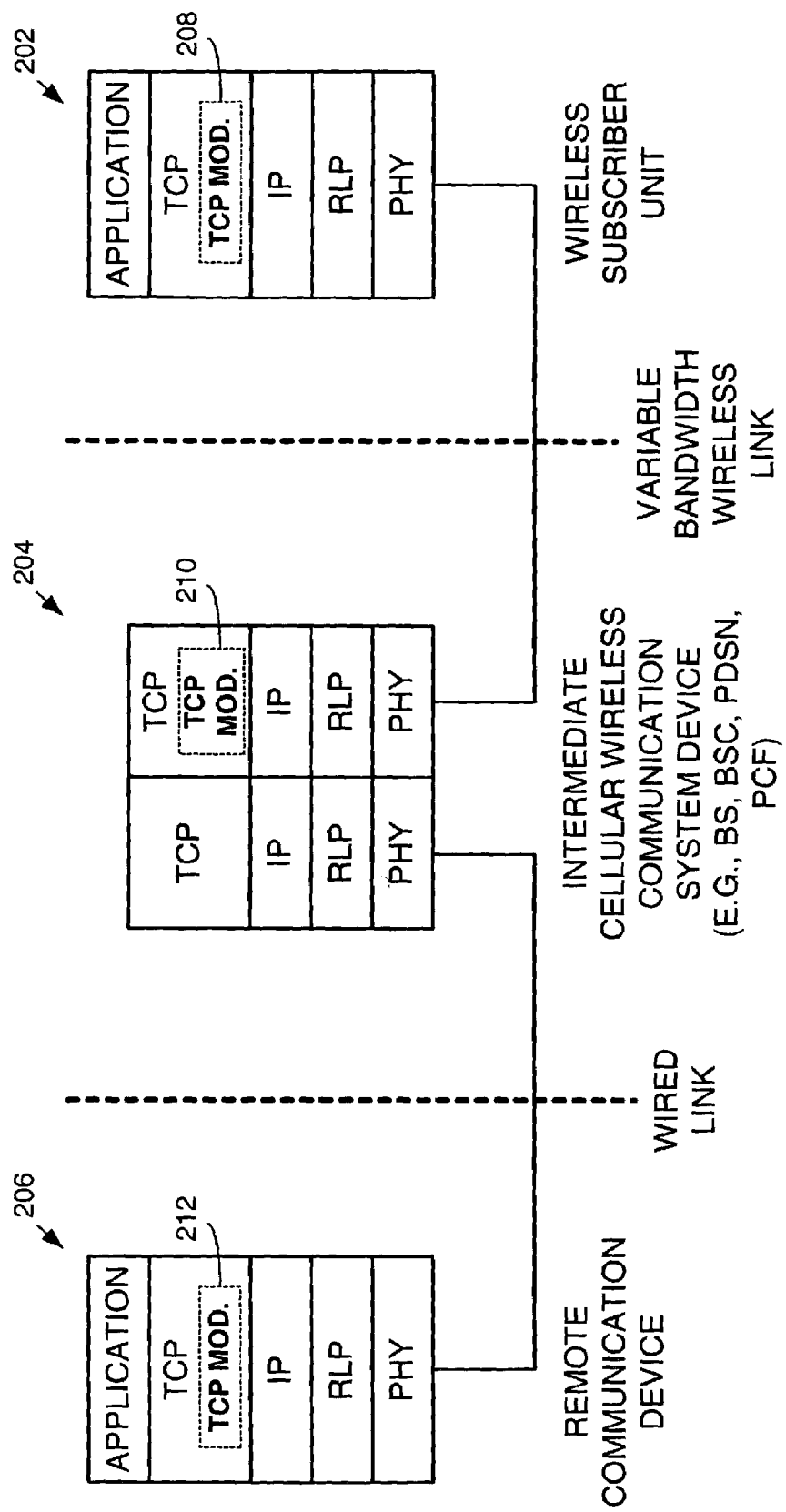
FIG. 2 is a block diagram illustrating a plurality of protocol layers that are supported according to the present invention.

FIG. 2 is a block diagram illustrating a plurality of protocol layers that are supported according to the present invention. The structure illustrated in FIG. 2 represents two separate embodiments of the present invention. In a first embodiment, one copy of an upper protocol layer of a protocol stack 202 that has been modified according to the present invention resides on the wireless subscriber unit 134 and one copy of the upper protocol layer of a protocol stack 204 that has been modified according to the present invention resides in an intermediate cellular wireless communication system device, e.g., PDSN 112, servicing the wireless subscriber unit 134. In another embodiment, one copy of the upper protocol layer of the protocol stack 202 that has been modified according to the present invention resides in the wireless subscriber unit 134 and one copy of the upper protocol layer of a protocol stack 206 that has been modified according to the present invention resides in a remote communication device, e.g., Web Server 124, with which the wireless subscriber unit 134 is communicating. As is shown, the communication link between the wireless subscriber unit 134 and the intermediate cellular wireless communication system device, e.g., PDSN 112, includes the variable bandwidth wireless link. The communication link between the intermediate cellular wireless communication system device, e.g., PDSN 112, and the remote communication device includes a conventional wired link.

With the first embodiment, the wireless subscriber unit 202 and the intermediate cellular wireless communication system device, e.g., PDSN 112, have operating thereupon upper protocol layers, e.g., TCP layers that have been modified according to the present invention. In such case, the TCP layer in protocol stack 202 includes TCP modifications 208 while the TCP layer in protocol stack 204 includes TCP modifications 210. Further, with the first embodiment, the intermediate cellular wireless communication system device, e.g., PDSN 112, has operating thereupon a parallel unmodified protocol stack that communicates with the remote communication device 124 in an unmodified manner across the wired link.

With the second embodiment, the wireless subscriber unit 202 and the intermediate cellular wireless communication system device, e.g., PDSN 112, have operating thereupon upper protocol layers, e.g., TCP layers, that have has been modified according to the present invention. In such case, the TCP layer in protocol stack 202 includes TCP modifications 208 while the TCP layer in protocol stack 206 includes TCP modifications 212. With the second embodiment, the intermediate cellular wireless communication system device, e.g., PDSN 112, operates in an unmodified manner.

Figure 3:
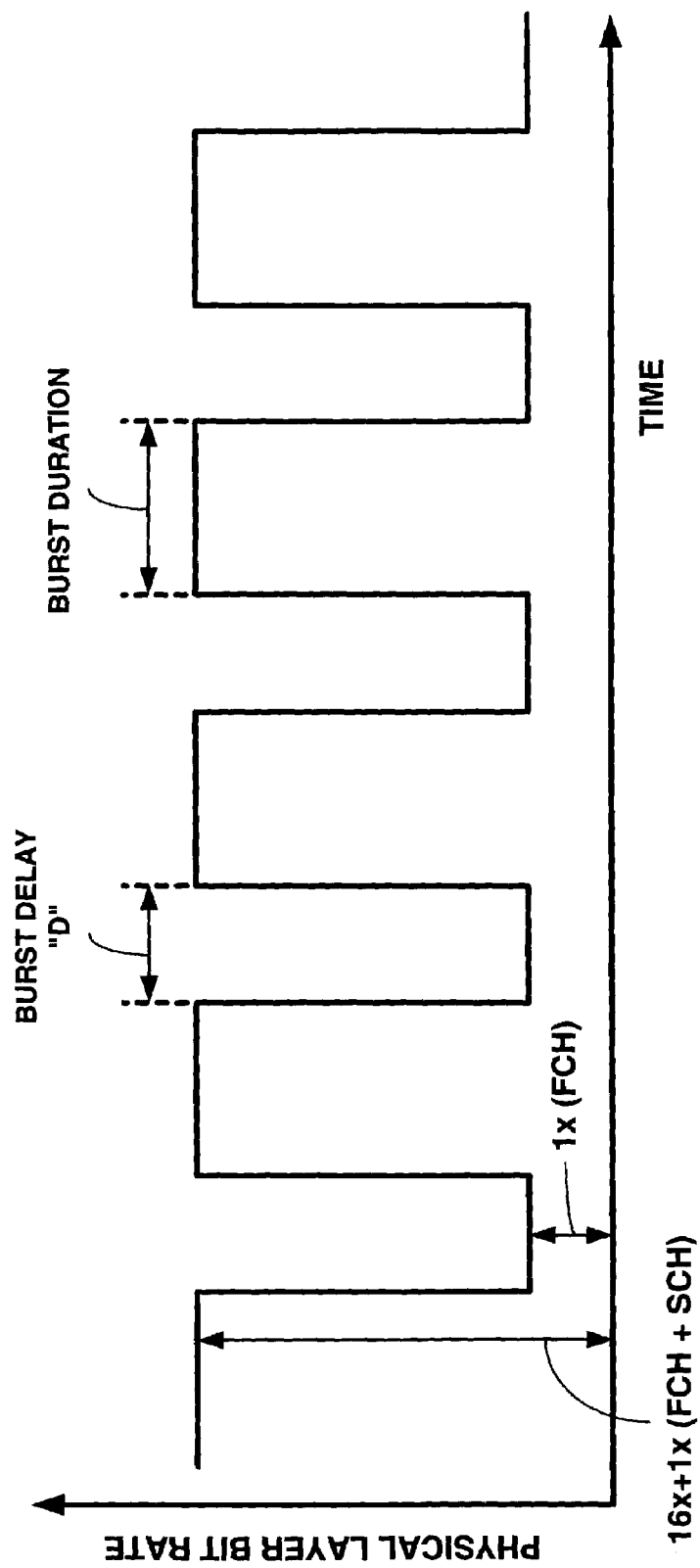
FIG. 3 is a graph illustrating fluctuating bandwidth that is provided during a data communication serviced by the cellular wireless communication system of FIG. 1.

FIG. 3 is a graph illustrating fluctuating bandwidth that is provided during a data communication serviced by the cellular wireless communication system of FIG. 1. The graph of FIG. 3 represents that wireless link illustrated in FIG. 2 that services the data communication between wireless subscriber unit 134 and web server 124, for example. As is illustrated in FIG. 3, the FCH is allocated for the duration of the data communication. Thus, during all times while the data communication is active a minimum bandwidth (represented by 1×) is provided. Also during the data communication, the SCH is allocated and released on a regular basis. While allocated, the total bandwidth of the wireless link is serviced by the FCH (1×) and the SCH (16×) and the wireless link provides a total bandwidth of (16×+1×), as indicated as a bit rate. Further, associated with the SCH are burst duration and a burst delay "D". The burst delay "D" is the delay period between a release of the SCH and a subsequent allocation of the SCH.

Figure 4:
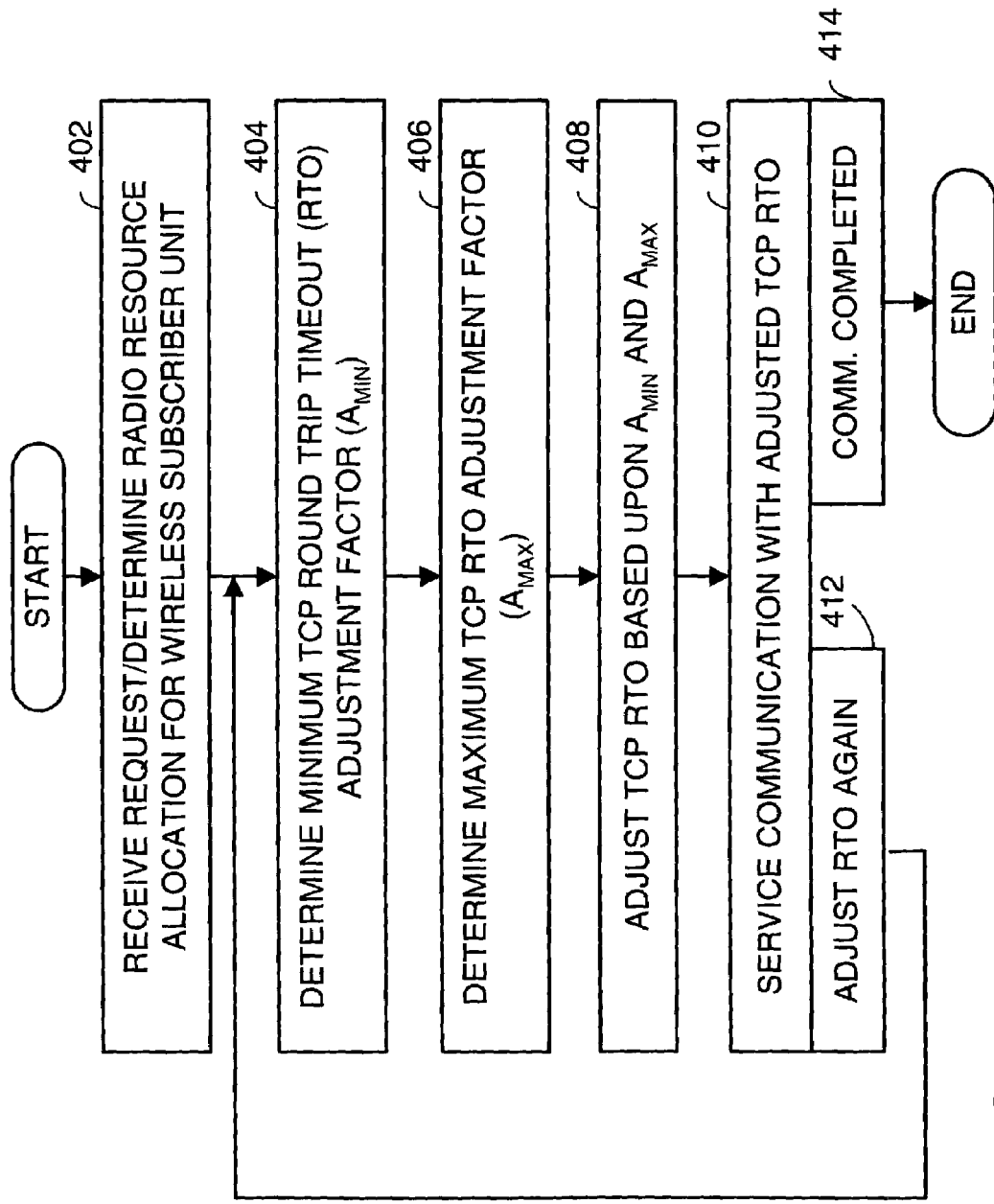
FIG. 4 is a logic diagram illustrating operation according to the present invention in servicing a data communication.

FIG. 4 is a logic diagram illustrating operation according to the present invention in servicing a data communication.

Operation commences with the cellular wireless communication system receiving a request from a wireless subscriber unit to service the data communication, determining a corresponding radio resource allocation, and allocating the radio resources for the data communication (step 402). The allocated radio resources include a FCH and a SCH.

Then, a minimum TCP RTO adjustment factor ($A_{min}$) is determined (step 404). The minimum adjustment factor, $A_{min}$, comes from the observation that after the SCH is released bandwidth collapses and:

If the delay between the SCH bursts, D, is sufficiently long, it would take at least one or several TCP data segments to go over the FCH and to trigger an ACK at the receiving TCP layer. Such operation is denoted by $N*OTT_{seg}$, where $OTT_{seg}$ is the one-trip-time of a TCP data segment over the FCH, and N is the number of TCP data segments generating an ACK (typically N=2 or 1). In accordance with this, a receiving TCP layer generates an ACK upon receipt of each N data segment(s), where N=1, 2, 3, etc. After the receipt of a TCP data segment, if N=1, the receiving TCP layer generates an ACK. However, if N>1, the receiving TCP layer starts a delta timer and waits to receive N−1 more TCP data segments. If the receiving TCP layer receives the N=1 segments before the delta timer expires, it immediately generates an ACK. However, the receiving TCP layer also generates an ACK upon expiration of the delta timer. Thus, the time to generate the ACK is min(N*OTTseg, OTTseg+delta timer) when N is greater than or equal to 2.

If the delay between the SCH bursts, D, is relatively short, the minimum RTO adjustment value should be equal to that delay, D.

Therefore, $A_{min}$=min($N*Ott_{seg}$, OTTseg+delta timer, D). As an example, consider the case when inter-burst delay D is known to be above 5 seconds and an ACK is generated for every other TCP data segment received, i.e. N=2. The TCP data segment size is then defined by the size of Maximum Transfer Unit (MTU) size. Assume that MTU=1000 Bytes and delta timer=200 ms. When only the FCH is active, it takes 20 ms to transmit 20 Bytes of a TCP data segment. Therefore, $OTT_{seg}$=MTU/20 Bytes*20 ms=1000 ms. $A_{min}$=min(2*1000 ms, 1000 ms+200 ms, 5000 ms)=1,200 ms.

Next, a maximum TCP RTO adjustment factor ($A_{max}$) is determined (step 406). As a worst case, all of the TCP data segments pending in the network fails to generate a successfully received ACK is considered. The number of such TCP data segments is determined by the congestion window size (cwnd) at the time when the bandwidth collapse occurs. This is exactly the number of unacknowledged TCP data segments in the network. Note that if all the TCP data segments in the network fail to generate a successfully received ACK, RTO re-transmission must occur since all the TCP data segments are truly lost. By the same argument as above, it would take RTT+(cwnd/20 bytes)*20 ms for all the TCP data segments to fail. Hence $A_{max}$=(cwnd_size_in_Bytes) ms, e.g., 7000 ms.

The method next includes determining a Retransmission Time Out (RTO) adjustment factor for an upper protocol layer servicing the wireless subscriber unit and adjusting a RTO value of the upper protocol layer based upon the RTO adjustment factor to produce an adjusted RTO value (step 408). The actual RTO adjustment factor, A, is chosen to be between the minimum value, $A_{min}$, and the maximum value, $A_{max}$, such that $A=A_{min}*k$ and $A<A_{max}$, where k is a factor specific to a particular network. Considering the above example, Amin was 1200 ms and $A_{max}$ was 7000 ms, a decision may be made to choose $A=2*A_{min}$=2400 ms. However, the actual value for A for any particular system may require empirical analysis and confirmation.

The method then includes servicing the data communication for the wireless subscriber unit using the adjusted RTO value to increase throughput at the upper protocol layer (step 410). Such operation will continue until the data communication is completed (step 414) or until the RTO value is again adjusted for the current data communication (step 412) where operation returns to step 404.

In many operations of the present invention, the RTO value will be adjusted on a system wide basis, and only periodically. In such case, steps 404–408 of FIG. 4 will be performed for the system as a whole and all further system wide operations will reflect such operations. In another operation, the steps of 404–408 will be performed on a base station by base station basis or a BSC by BSC basis, depending upon how the availability and operation of the SCH varies across the cellular wireless communication system. All data communications will then be serviced consistent with the system wide (or sub-system wide) adjusted RTO values.

The operations of FIG. 4 in determining the adjusted RTO value may be performed by the PDSN 112, a system manager, or another device operating within the cellular wireless communication system or in conjunction with the cellular wireless communication system. Then, the devices having corresponding upper protocol layers servicing the data communication according to the present invention will be modified accordingly, as was described with reference to FIG. 2. FIGS. 5–8 describe various devices that have residing thereupon TCP layers that have been modified according to the present invention.

Figure 5:
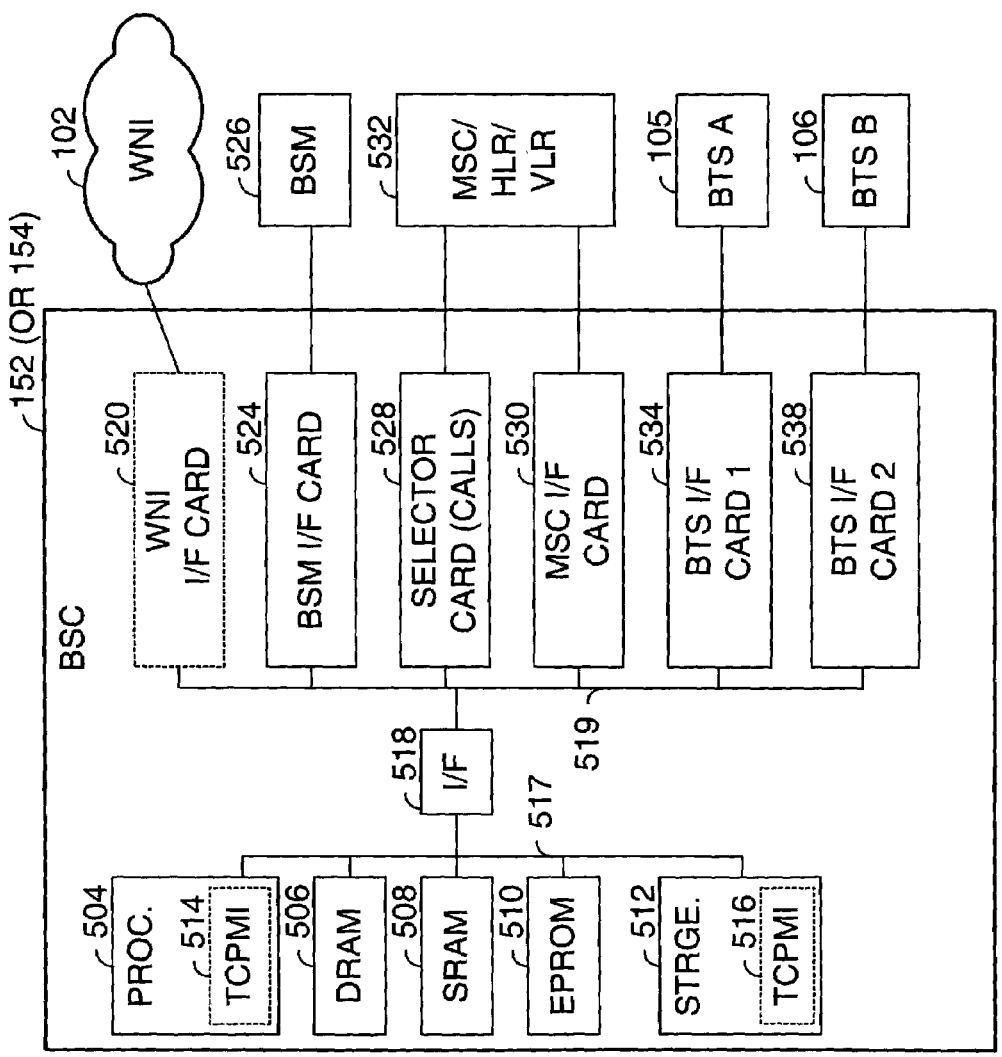
FIG. 5 is a block diagram illustrating the structure of a Base Station Controller (BSC) that operates according to the present invention.

FIG. 5 is a block diagram illustrating a Base Station Controller (BSC) 152 (or 154) constructed according to the present invention. The structure and operation of BSCs is generally known. The BSC 152 services circuit switched and/or packet switched operations. In some cases, the BSC 152 is called upon to convert data between circuit switched and data switched formats, depending upon the types of equipment coupled to the BCS 152. The components illustrated in FIG. 5, their function, and the interconnectivity may vary without departing from the teachings of the present invention.

The BSC 152 includes a processor 504, dynamic RAM 506, static RAM 508, EPROM 510, and at least one data storage device 512, such as a hard drive, optical drive, tape drive, etc. These components intercouple via a local bus 517 and couple to a peripheral bus 519 via an interface 518. Various peripheral cards couple to the peripheral bus 519. These peripheral cards include a wireless network infrastructure interface card 520, a base station manager interface card 524, at least one selector card 528, an MSC interface card 530, and a plurality of BTS interface cards 534 and 538.

The wireless network infrastructure interface card 520 couples the BSC 152 to wireless network infrastructure 102. The base station manager interface card 524 couples the BSC 152 to a Base Station Manager 526. The selector card 528 and MSC interface card 530 couple the BSC 152 to an MSC/HLR/VLR 532. The BTS interface cards 534 and 538 couple the BSC 152 to base stations 105 and 106, respectively.

TCP Modification Instructions (TCPMI) 516 and 514, along with the BSC 152 hardware, enable the BSC 152 to perform the operations of the present invention. The TCPMI 516 are loaded into the storage unit 512 and, upon their execution, some or all of the TCPMI 514 are loaded into the processor 504 for execution. During this process, some of the TCPMI 516 may be loaded into the DRAM 506.

Figure 6:
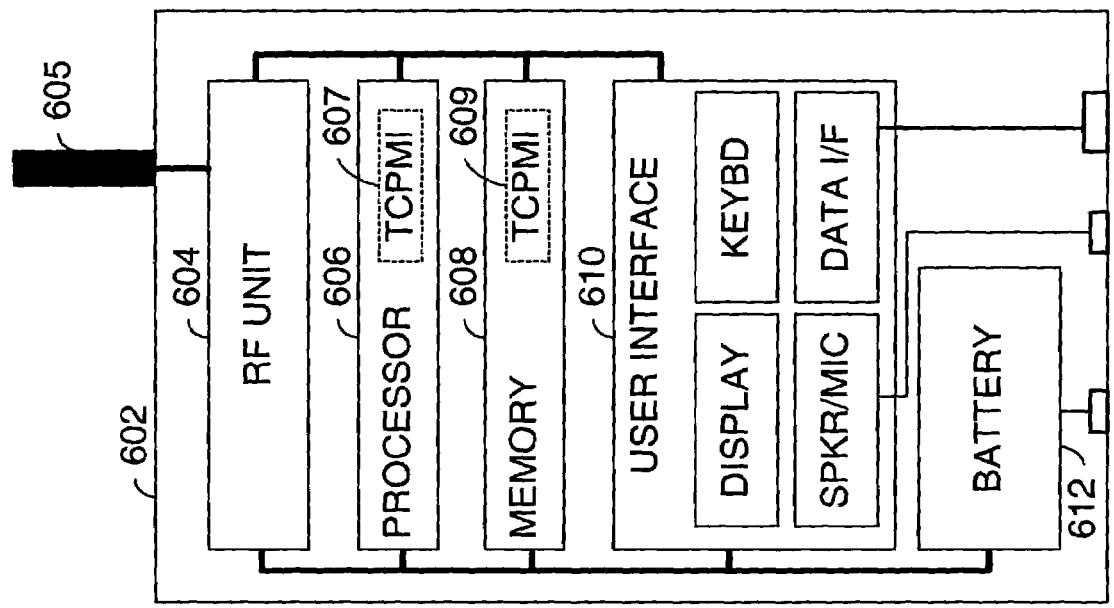
FIG. 6 is a block diagram illustrating the structure of a wireless subscriber unit that operates according to the present invention.

FIG. 6 is a block diagram illustrating the structure of a wireless subscriber unit 602 constructed according to the present invention. The wireless subscriber unit 602 operates within the cellular wireless communication system, such as that described with reference to FIG. 1 (wirelessly enabled laptop computer 134) and according to the operations described with reference to FIGS. 1–4. The wireless subscriber unit 602 includes an RF unit 604, a processor 606, and a memory 608. The RF unit 604 couples to an antenna 605 that may be located internal or external to the case of the wireless subscriber unit 602. The processor 606 may be an Application Specific Integrated Circuit (ASIC) or another type of processor that is capable of operating the wireless subscriber unit 602 according to the present invention. The memory 608 includes both static and dynamic components, e.g., DRAM, SRAM, ROM, EEPROM, etc. In some embodiments, the memory 608 may be partially or fully contained upon an ASIC that also includes the processor 606. A user interface 610 includes a display, a keyboard, a speaker, a microphone, and a data interface, and may include other user interface components. The RF unit 604, the processor 606, the memory 608, and the user interface 610 couple via one or more communication buses/links. A battery 612 also couples to and powers the RF unit 604, the processor 606, the memory 608, and the user interface 610.

The wireless subscriber unit 602 operates according to the present invention as previously described. In its operation TCPMI 609 are stored in memory and executed by the processor 607 as TCPMI 607. The structure of the wireless subscriber unit 602 illustrated is only an example of one wireless subscriber unit structure. Many other varied wireless subscriber unit structures could be operated according to the teachings of the present invention.

Figure 7:
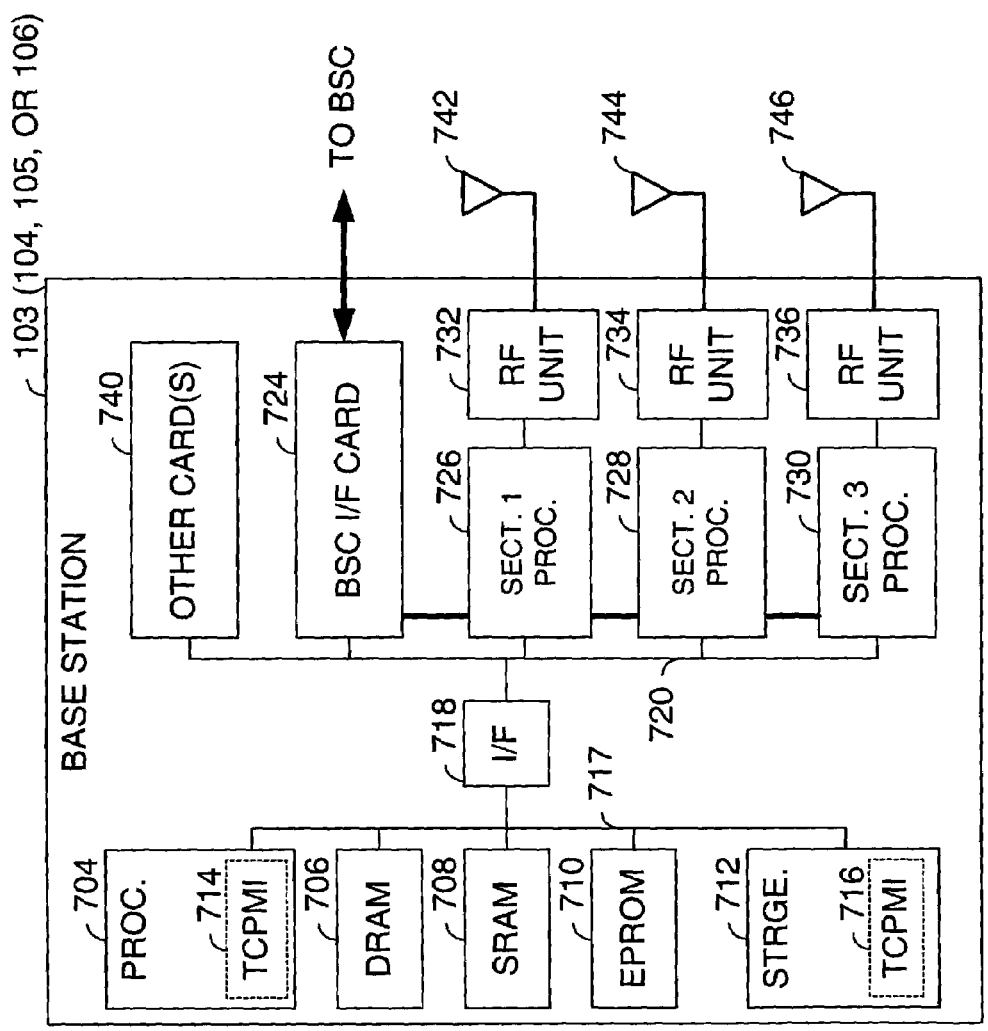
FIG. 7 is a block diagram illustrating the structure of a base station that operates according to the present invention.

FIG. 7 is a block diagram illustrating the structure of a base station 103 (104, 105, or 106) constructed according to the present invention. The base station 103 includes a processor 704, dynamic RAM 706, static RAM 708, EPROM 710, and at least one data storage device 712, such as a hard drive, optical drive, tape drive, etc. These components (which may be contained on a peripheral processing card or module) intercouple via a local bus 717 and couple to a peripheral bus 720 (which may be a back plane) via an interface 718. Various peripheral cards couple to the peripheral bus 720. These peripheral cards include a BSC interface card 724, which couples the base station 103 to its servicing BSC.

Digital processing cards 726, 728 and 730 couple to Radio Frequency (RF) units 732, 734, and 736, respectively. Each of these digital processing cards 726, 728, and 730 performs digital processing for a respective sector, e.g., sector 1, sector 2, or sector 3, serviced by the base station 103. The RF units 732, 734, and 736 couple to antennas 742, 744, and 746, respectively, and support wireless communication between the base station 103 and wireless subscriber units. Further, the RF units 732, 734, and 736 operate according to the present invention. The base station 103 may include other card(s) 740 as well.

TCPMI 714 and TCPMI 714 enable the BSC 103 to perform the operations of the present invention. The TCPMI 716 are loaded into the storage unit 712 and some or all of the TCPMI 714 are loaded into the processor 704 for execution. During this process, some of the TCPMI 716 may be loaded into the DRAM 706.

Figure 8:
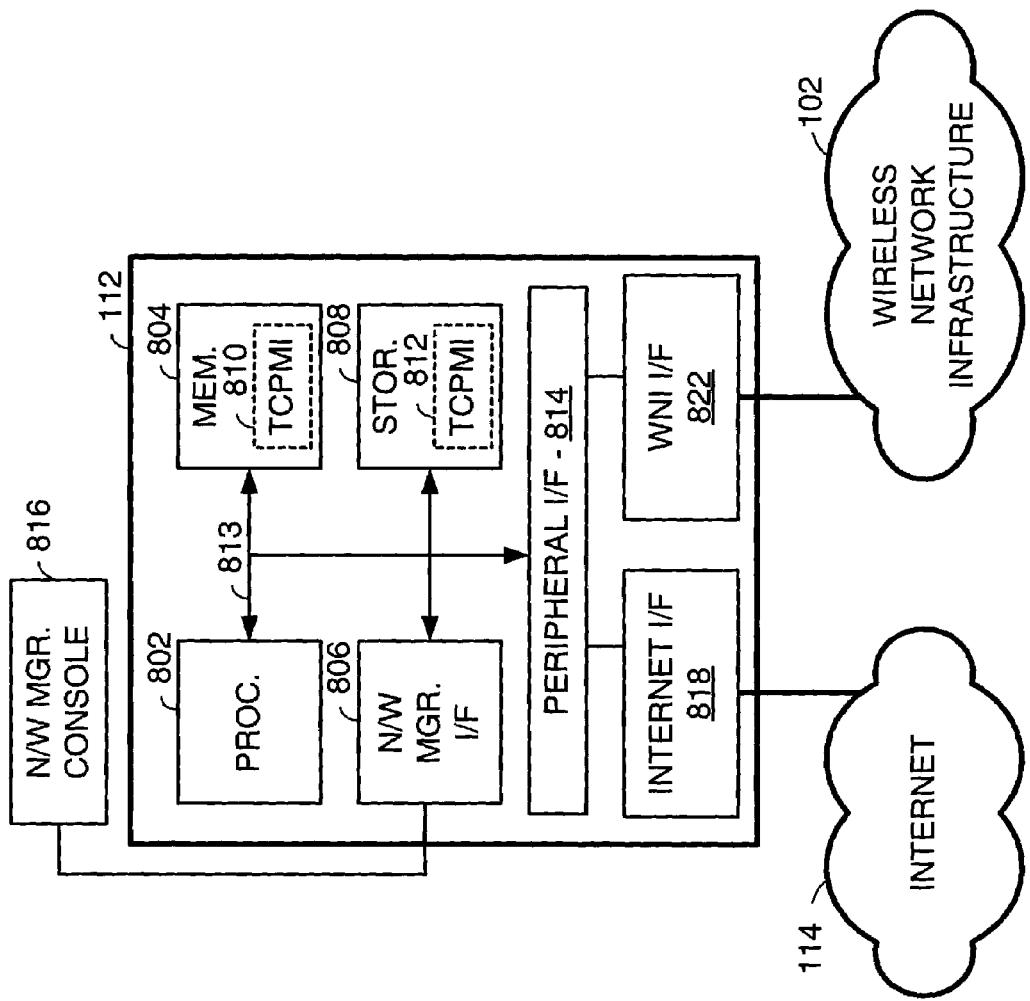
FIG. 8 is a block diagram illustrating the structure of a Packet Data Servicing Node (PDSN) that operates according to the present invention.

FIG. 8 is a block diagram illustrating a Packet Data Servicing Node (PDSN) 112 constructed according to the present invention. The PDSN 112 may be general-purpose computer that has been programmed and/or otherwise modified to perform the particular operations described herein. The PDSN 112 includes a processor 802, memory 804, a network manager interface 806, storage 808 and a peripheral interface 814, all of which couple via a processor bus 813. The processor 802 may be a microprocessor or another type of processor that executes software instructions to accomplish programmed functions. The memory 804 may include DRAM, SRAM, ROM, PROM, EPROM, EEPROM or another type of memory in which digital information may be stored. The storage 808 may be magnetic disk storage, magnetic tape storage, optical storage, or any other type of device, which is capable of storing digital instructions and data.

The network manager interface 806 couples to a network manager console 816, which allows a network manager to interface with the PDSN 112 via a network manager console 816. The network manager console 816 may be a keypad/display or may be a more complex device, such as a personal computer, which allows the manager to interface with the PDSN 112. However, the network manager may interface with the PDSN 112 using other techniques as well, e.g., via a card coupled to the peripheral interface 810.

The peripheral interface 810 couples to an Internet interface 818 and to wireless network infrastructure interface 822. The Internet interface 818 couples the PDSN 112 to the Internet 114. The wireless network infrastructure interface 822 couples the PDSN 112 to the wireless network infrastructure 102 of the cellular wireless communication system that it services.

TCPMI 812 are loaded into the storage 808 of the PDSN 112. Upon their execution, a portion of the TCPMI 812 is downloaded into memory 804 (as TCPMI 810). The processor 802 then executes the TCPMI 810 to perform the operations described herein performed by the PDSN 112. The programming and operation of digital computers is generally known to perform such steps. Thus, the manner in which the processor 802 and the other components of the PDSN 112 function to perform these operations are not further described herein.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for servicing a data communication in a cellular wireless communication system, the method comprising:

receiving a request from a wireless subscriber unit to service the data communication;

allocating radio resources to the wireless subscriber unit, wherein the radio resources include a fundamental channel and a supplemental channel, and wherein the supplemental channel has associated therewith a burst delay that is a delay period between a release of the supplemental channel (SCH) and a subsequent allocation of the SCH;

determining a Retransmission Time Out (RTO) adjustment factor for an upper protocol layer servicing the wireless subscriber unit, wherein the RTO adjustment factor is based upon the burst delay of the supplemental channel;

adjusting a RTO value of the upper protocol layer based upon the RTO adjustment factor to produce an adjusted RTO value; and servicing the data communication for the wireless subscriber unit using the adjusted RTO value to increase throughput at the upper protocol layer.

2. The method of claim 1, wherein the adjustment RTO value is also based upon a Round Trip Time (RTT) of the data communication when serviced only by the fundamental channel.

3. The method of claim 2, wherein the adjustment RTO value is also based upon a multiple of a Round Trip Time (RTT) of the data communication when serviced only by the fundamental channel.

4. The method of claim 1, wherein the adjustment RTO value is also based upon an expected total number of unacknowledged upper protocol layer data segments outstanding when the supplemental channel becomes unavailable.

5. The method of claim 1, wherein the upper protocol layer comprises the Transmission Control Protocol (TCP) layer.

6. The method of claim 1, wherein:
one copy of the upper protocol layer is operational in the wireless subscriber unit; and
one copy of the upper protocol layer is operational in an intermediate cellular wireless communication system device servicing the wireless subscriber unit.

7. The method of claim 6, wherein the intermediate cellular wireless communication system device servicing the wireless subscriber unit is selected from the group consisting of a base station, a base station controller, a Packet Data Serving Node, and a Packet Control Function.

8. The method of claim 1, wherein:
one copy of the upper protocol layer is operational in the wireless subscriber unit; and
one copy of the upper protocol layer is operational in a remote communication device with which the wireless subscriber unit is communicating.

9. A method for servicing a data communication in a cellular wireless communication system, the method comprising:
receiving a request from a wireless subscriber unit to service the data communication;
allocating radio resources to the wireless subscriber unit, wherein the radio resources include a fundamental channel and a supplemental channel, and wherein the supplemental channel has associated therewith a burst delay that is a delay period between a release of the supplemental channel (SCH) and a subsequent allocation of the SCH;
determining a Retransmission Time Out (RTO) adjustment factor for a Transmission Control Protocol (TCP) layer servicing the wireless subscriber unit, wherein the RTO adjustment factor is based upon:
the burst delay of the supplemental channel; and
a Round Trip Time (RTT) of the data communication when serviced only by the fundamental channel;
adjusting a RTO value of the upper protocol layer based upon the RTO adjustment factor to produce an adjusted RTO value; and
servicing the data communication for the wireless subscriber unit using the adjusted RTO value to increase throughput at the upper protocol layer.

10. The method of claim 9, wherein the adjustment RTO value is based upon a multiple of a Round Trip Time (RTT) of the data communication when serviced only by the fundamental channel.

11. The method of claim 9, wherein the adjusted RTO value is also based upon an expected total number of unacknowledged upper protocol layer data segments outstanding when the supplemental channel becomes unavailable.

12. The method of claim 9, wherein:
one copy of the TCP layer is operational in the wireless subscriber unit; and
one copy of the TCP layer is operational in an intermediate cellular wireless communication system device servicing the wireless subscriber unit.

13. The method of claim 12, wherein the intermediate cellular wireless communication system device servicing the wireless subscriber unit is selected from the group consisting of a base station, a base station controller, a Packet Data Serving Node, and a Packet Control Function.

14. A method for determining an adjustment Retransmission Time Out (RTO) value for an upper protocol layer that services a wireless subscriber unit data communication within a cellular wireless communication system device, the wireless subscriber unit data communication serviced by a wireless link of the cellular wireless communication system that includes a fundamental channel and a supplemental channel, wherein the supplemental channel has associated therewith a burst delay, the method comprising:
determining a minimum RTO adjustment factor based upon the burst delay of the supplemental channel that is a delay period between a release of the supplemental channel (SCH) and a subsequent allocation of the SCH;
determining a maximum RTO adjustment factor based upon an expected total number of unacknowledged upper protocol layer data segments outstanding when the supplemental channel is released;
determining a RTO adjustment factor for the upper protocol layer that services the wireless subscriber unit data communication based upon the minimum RTO adjustment factor and the maximum RTO adjustment factor; and
adjusting an RTO value of the upper protocol layer based upon the RTO adjustment factor to produce the adjusted RTO value for the upper protocol layer that services the wireless subscriber unit data communication within the cellular wireless communication system device.

15. The method of claim 14, wherein the minimum RTO adjustment factor is also based upon a Round Trip Time (RTT) of the data communication when serviced only by the fundamental channel.

16. The method of claim 14, wherein the minimum RTO adjustment factor is also based upon a multiple of a Round Trip Time (RTT) of the data communication when serviced only by the fundamental channel.

17. The method of claim 14, wherein the upper protocol layer comprises the Transmission Control Protocol (TCP) layer.

18. The method of claim 14, wherein:
one copy of the upper protocol layer is operational in the wireless subscriber unit; and one copy of the upper protocol layer is operational in an intermediate cellular wireless communication system device servicing the data communication.

19. The method of claim 18, wherein the intermediate cellular wireless communication system device servicing the wireless subscriber unit is selected from the group consisting of a base station, a base station controller, a Packet Data Serving Node, and a Packet Control Function.

20. The method of claim 14, wherein:
one copy of the upper protocol layer is operational in the wireless subscriber unit; and
one copy of the upper protocol layer is operational in a remote communication device with which the wireless subscriber unit is communicating via the data communication.

\* \* \* \* \*

UNITED STATES PATENT AND TRADEMARK OFFICE
CERTIFICATE OF CORRECTION

PATENT NO. : 7,180,871 B1  
APPLICATION NO. : 10/173093  
DATED : February 20, 2007  
INVENTOR(S) : Farid T. Khafizov, Mehmet Yavuz and Nanping Ding It is certified that error appears in the above-identified patent and that said Letters Patent is hereby corrected as shown below:

TITLE PAGE, ITEM (75) INVENTORS, SHOULD READ;  
(75) Inventors: Farid T. Khafizov, Plano, TX (US); Mehmet Yavuz, Plano, TX (US); Nanping Ding, Nepean (CA)

Signed and Sealed this

Twenty-sixth Day of June, 2007

JON W. DUDAS  
*Director of the United States Patent and Trademark Office*